July 29, 1930. W. C. JOHNSON 1,771,638
WASHER
Filed March 26, 1928
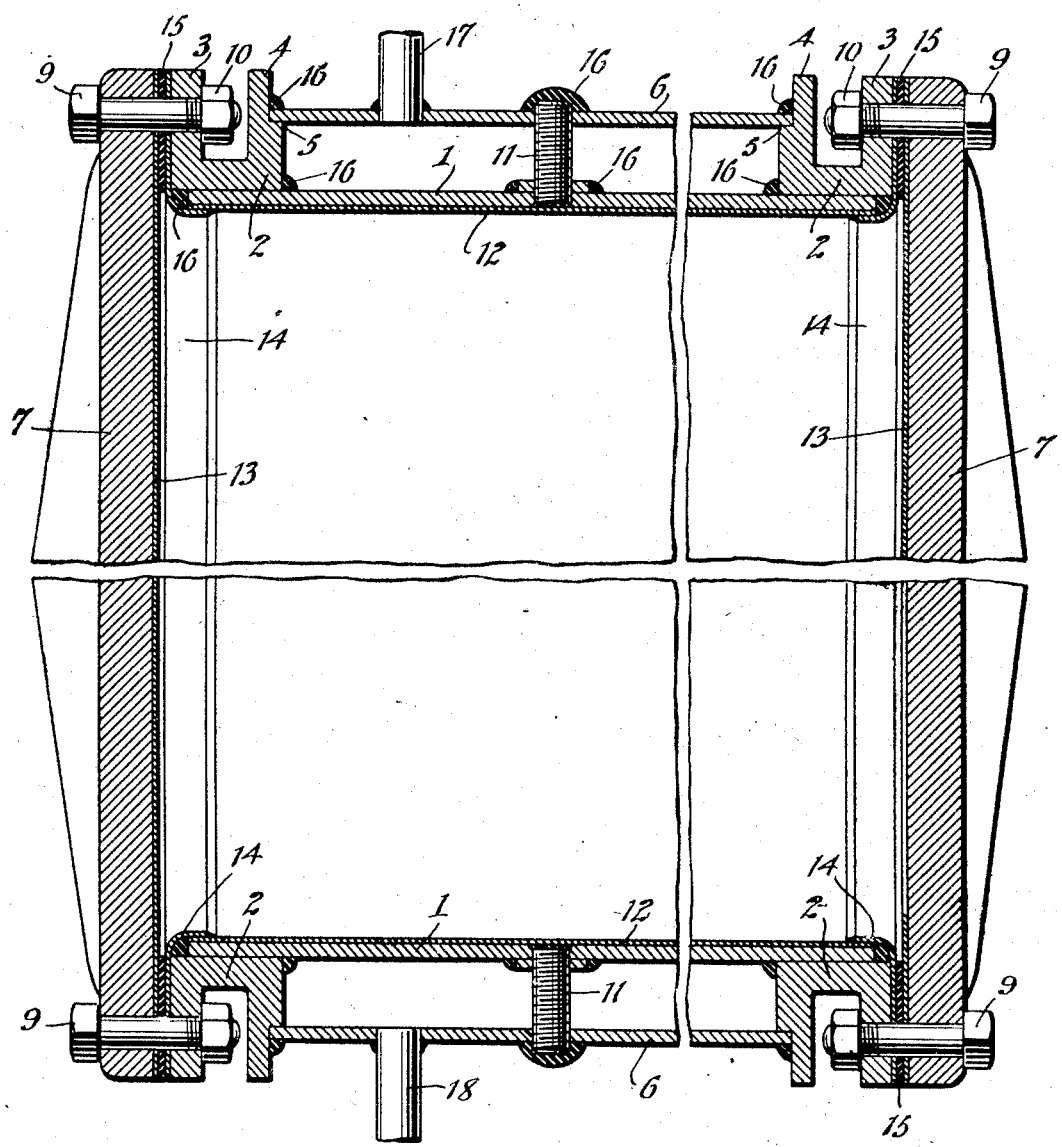
WITNESSES
Edw. Thorpe
S. W. Foster
INVENTOR
Wallace C. Johnson
BY
Munn & Co.
ATTORNEY Patented July 29, 1930

1,771,638

UNITED STATES PATENT OFFICE

WALLACE C. JOHNSON, OF SOUTH ORANGE, NEW JERSEY, ASSIGNOR TO THE SAFETY DRY CLEANING SYSTEM COMPANY, OF PHILADELPHIA, PENNSYLVANIA, A CORPORATION OF NEW JERSEY

WASHER

Application filed March 26, 1928. Serial No. 264,630.

This invention relates to washers and more specifically to an improved steam jacketed nickel lined receptacle, and I employ the term "washer" because the device is primarily adapted for use as a washer in connection with the dry cleaning of clothes or other articles although of course the device may include other uses.

An object of the invention is to provide a washer having a steam jacket and heads securely bolted to the grooved rings on the ends of a cylinder, the entire inner faces of the cylinder and heads being lined with sheet nickel and all joints welded so as to insure absolutely tight chambers and a rigid construction.

With these and other objects in view, the invention consists in certain novel features of construction and combinations and arrangements of parts which will be more fully hereinafter described and pointed out in the claims.

In the accompanying drawing the figure is a broken view in longitudinal section illustrating my improved washer.

1 represents a cylinder, on the ends of which grooved rings 2, 2 are securely welded. These grooved rings provide outer and inner flanges 3 and 4, respectively, and the inner flanges are recessed to provide shoulders 5 on which a cylindrical steam jacket 6 is located and securely welded.

7, 7 represents heads which are secured to the outer flanges 3 of rings 2 by bolts 9 and nuts 10, said bolts projected through alined openings in the head and flange, as clearly illustrated. Stay bolts 11 connect the casing 1 and steam jacket 6 and are securely welded to both of said parts so as to render the juncture steam-tight.

A cylindrical nickel lining 12 is secured against the inner face of casing 1, nickel disks or lining plates 13 are secured against the inner faces of the heads 7 and project between the heads and the flanges 3 of rings 2, and lining rings 14 are located against the rings between the same and the heads 7 and are flared or bent inwardly so as to overlap the lining 12.

Gaskets 15 are also preferably located between the lining disks 13 and rings 14 and securely clamped between the same by means of the bolts 9 and nuts 10 above referred to.

Throughout the figure I illustrate welding material by the reference character 16 and it will be noted that I provide this welding solder at all points and at all joints where the metal parts meet so as to absolutely insure a tight juncture of the parts. This is of vital importance as it is necessary of course to prevent any possibility of steam entering the interior of the washer and also to prevent fluid or vapor passing from the washer into the steam jacket.

The reason I employ nickel as a lining material is that I find it the best material to resist any chemical action of the washing fluid that I employ, and furthermore by reason of the construction above described it will be noted that the rings 2 not only provide means whereby the steam jacket is spaced from the cylinder but also provide means whereby the heads can be rigidly secured but removal of the heads permitted as occasion may require.

I have illustrated inlet and outlet steam pipes 17 and 18 communicating with the steam jacket 6, and it is of course to be understood that the drawing is a section which is taken longitudinally through the casing at a point removed from a door or other entrance which is of course necessary for the admission and removal of clothes or other articles to be washed.

While I have illustrated what I believe to be a preferred embodiment of my invention, it is obvious various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. As a new article of manufacture, a washer including a cylindrical casing, annularly grooved rings secured on the ends of the casing and constituting outwardly projecting parallel flanges, the inner flanges having shoulders thereon, a steam jacket se-